US009295225B2

(12) United States Patent
Monk et al.

(10) Patent No.: US 9,295,225 B2
(45) Date of Patent: Mar. 29, 2016

(54) SPECIES SPECIFIC FEEDER

(71) Applicants: Harold G Monk, Denham Springs, LA (US); Jeffrey R Lewis, Saint Joseph, LA (US)

(72) Inventors: Harold G Monk, Denham Springs, LA (US); Jeffrey R Lewis, Saint Joseph, LA (US)

( * ) Notice: Subject to any disclaimer, the term of this patent is extended or adjusted under 35 U.S.C. 154(b) by 112 days.

(21) Appl. No.: 13/833,764

(22) Filed: Mar. 15, 2013

(65) Prior Publication Data

US 2014/0261201 A1 Sep. 18, 2014

(51) Int. Cl.
*A01K 5/02* (2006.01)
*A01K 5/01* (2006.01)

(52) U.S. Cl.
CPC ............... *A01K 5/0142* (2013.01); *A01K 5/025* (2013.01); *A01K 5/0225* (2013.01); *A01K 5/0258* (2013.01); *A01K 5/0275* (2013.01)

(58) Field of Classification Search
CPC ......... A01K 5/00; A01K 5/02; A01K 5/0225; A01K 5/0291; A01K 5/025; A01K 39/01; A01K 39/0113; A01K 39/012; A01K 5/0258
USPC ............. 119/51.01, 51.02, 51.11, 52.4, 57.1, 119/57.92
IPC ................................................ A01K 5/00, 5/02
See application file for complete search history.

(56) References Cited

U.S. PATENT DOCUMENTS

| 3,465,724 A | 9/1969 | Broadbent | |
|---|---|---|---|
| 3,897,753 A | 8/1975 | Lee | |
| 2003/0125946 A1* | 7/2003 | Hsu | G10L 17/26 704/246 |
| 2004/0089244 A1 | 5/2004 | Marshall | |
| 2004/0144018 A1* | 7/2004 | Sloop | 43/131 |
| 2005/0049877 A1* | 3/2005 | Agranat | A01K 11/008 704/270 |
| 2005/0126505 A1* | 6/2005 | Gallager | G02B 27/52 119/234 |
| 2006/0180093 A1 | 8/2006 | Cross | |
| 2006/0201433 A1* | 9/2006 | Kates | A01K 15/02 119/51.02 |
| 2008/0298962 A1* | 12/2008 | Sliwa | F03D 11/00 416/31 |
| 2011/0192213 A1* | 8/2011 | Zimmerman et al. | 73/23.3 |
| 2011/0297090 A1 | 12/2011 | Chamberlain | |
| 2013/0223693 A1* | 8/2013 | Chamberlain | A01K 73/10 382/110 |
| 2015/0216145 A1* | 8/2015 | Nelson | A01K 39/0113 119/51.02 |

OTHER PUBLICATIONS

Lapidge, Steven, Development of a Feral Swine Toxic Bait (Hog-Gone®) and Bait Hopper (Hog-Hopper™) in Australia and the USA, Proceedings of the 14th WDM Conference, 2012, p. 19-24.
Written Opinion and Search Report from related application PCT/US14/24851 mailed Aug. 21, 2014.

* cited by examiner

*Primary Examiner* — Kathleen Alker
(74) *Attorney, Agent, or Firm* — John B. Edel; Edel Patents LLC

(57) ABSTRACT

Animal feeders useful in feeding particular groups of animals are disclosed. Animal feeders described herein may, for example, include an electrically conductive exterior structure; a door; a door lock; a species recognition device; and an electric shock deterrent. Methods of feeding animals utilizing an electric shock deterrent are also disclosed.

15 Claims, 3 Drawing Sheets

SPECIES SPECIFIC FEEDER

Embodiments described herein have utility in the field of feeding animals and particular utility when it is desirable to feed particular groups of animals. Animal feeders described herein may, for example, comprise an electrically conductive exterior structure; a door; a door lock; a species recognition device; and an electric shock deterrent. In a related example, the door lock is arranged and configured to respond to an output from the species recognition device. In another related example, the electric shock deterrent is arranged and configured to respond to an output from the species recognition device. In a further related example, the electric shock deterrent is arranged and configured to deactivate in response to the presence of a particular species. In a still further related example, the particular species is a member of a class selected from wild boar, deer, bears, bats, raccoons, and pigeons. In a still further related example, the particular species is a species of wild boar. In a related example, the electric shock deterrent is arranged and configured to reactivate after a period of time in which there is no recognition of a particular species. In a related example, the door lock is arranged and configured to unlock in response to the presence of a particular species. In a related example, the door is arranged and configured to open in response to the presence of a particular species. In a still further related example, the door is arranged and configured to close after a period of time in which a particular species is not detected. In a further related example, the electrically conductive exterior structure is electrically connected to the electric shock deterrent. In a further related example, the species recognition device is a device capable of recognizing sounds unique to particular animal species. In a related example the animal feeder further comprises an intermittent feed dispenser and in a further related example the animal feeder further comprises a population controlling feed.

A species specific feeding method described herein may, for example, comprise providing a feeder comprising an electric shock deterrent; activating the electric shock deterrent; delivering a shock to a first member of a first species; recognizing the presence of a member of a second species; deactivating the electric shock deterrent; allowing the member of the second species to feed at the feeder; and reactivating the electric shock deterrent. In a related example, the feeding method may further comprise placing a population control feed in the feeder.

DETAILED DESCRIPTION

Example 1

Feeder

Figure 1:
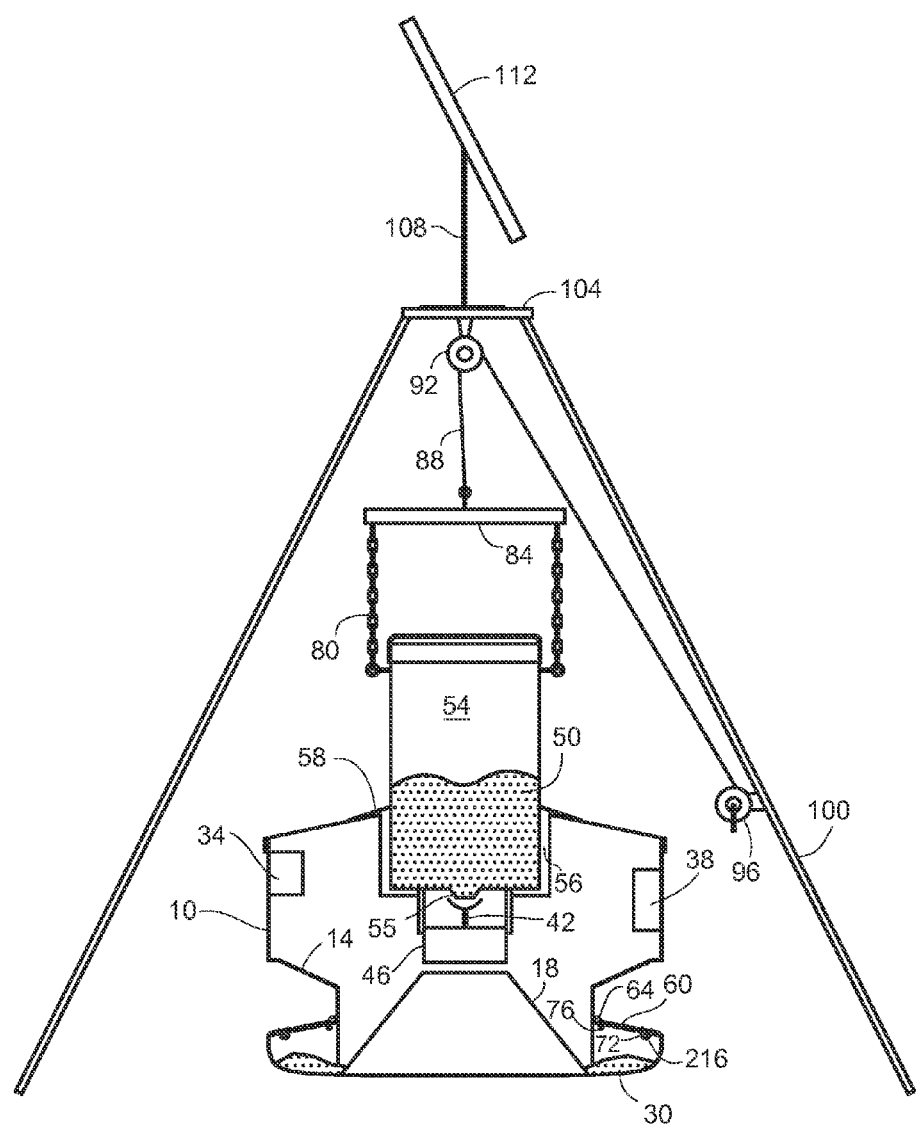
FIG. 1 is a cut away view of the species specific feeder.

Referring now to FIG. 1, the feeder may be constructed in a configuration commonly used for feeding a targeted species. In the embodiment depicted in FIG. 1, the species being fed is wild boar and the basic structure of Feeder 10 is a modified hog or pig feeder. In the present embodiment, Feeder 10 is constructed from a commercially available twelve door hog feeder. Feeder walls 14 and other feeder components may be constructed of durable materials commonly used in feeding application such as galvanized steel. Feeder 10 has a Feeder interior cone 18 which directs Dispensed feed 30 to a position near Door 60. Electronics within Electrical control box 34 regulate the operation of Feeder 10. Electrical pulse charger 38 energizes Feeder 10 at times when electrical pulses are used as a feeding deterrent. Electrical pulse charger 38 is an electrical pulse generating device comparable to device is used in certain animal enclosures and is capable of delivering a brief, nonlethal, and deterrent shock to animals coming into contact with the electrical conductor energized by Electrical pulse charger 38. Electrical pulse charger 38 may for example be the 5 Mile Battery Operated Solid State Charger sold as model number EDC5M-Z by Woodstream Corporation. In the present embodiment, Electrical pulse charger 38 is configured to energize substantially all of the perimeter of Feeder 10 such that Feeder walls 14 are energized and such that animals attempting to feed from Feeder 10 while energized would experience a deterrent shock. Auger 42 is situated atop Feed motor 46 and both Auger 42 and Feed motor 46 are situated below Barrel 54 such that the running of Auger 42 by actuation of Feed motor 46 causes the distribution of feed from undispensed feed 50 within Barrel 54 down Feeder interior cone 18 to a position adjacent to Door 60. Auger 42 may be an adjustable and programmable timer feeder with a rotating feed slinger plate that disperses feed at pre-programmed times. Auger 42 may be powered by Battery 168. Feed motor 46 is controlled from Electrical control box 34.

Barrel 54 is situated within the top of Feeder 10 such that it closely fits within Feeder top opening 56 with Barrel flange 58 resting on the top of Feeder 10 and such that Barrel 54 is held in a position such that Barrel discharge 55 is aligned with Auger 42 and Feed motor 46. Barrels 54 may be replaced through a lifting mechanism including Barrel hoist chains 80, Barrel hoist bar 84, Barrel hoist line 88, Barrel hoist pulley 92, and Pulley crank 96. Barrel hoist pulley 92 is supported by Tripod top stand 104 which is a part of Tripod 100.

In the present embodiment Doors 60 are attached to Feeder 10 by Door hinge 64. Doors 60 may be locked closed by Door solenoid 72 which drives a pin in and out of U-bolt 216. U-bolt 216 is situated on Door 60 opposite Door hinge 64. At times when Door solenoid 72 is in the unlocked position Door gear motor 76 may drive Door 60 into an open position and then later drive Door 60 into a closed position.

Electrical control box 34 contains one or more batteries (not shown) which receive power from Solar panel 112. Those batteries then in turn provide power to the various electrical components within Feeder 10. Solar panel 112 is held in position by Solar power stand 108.

Figure 2:
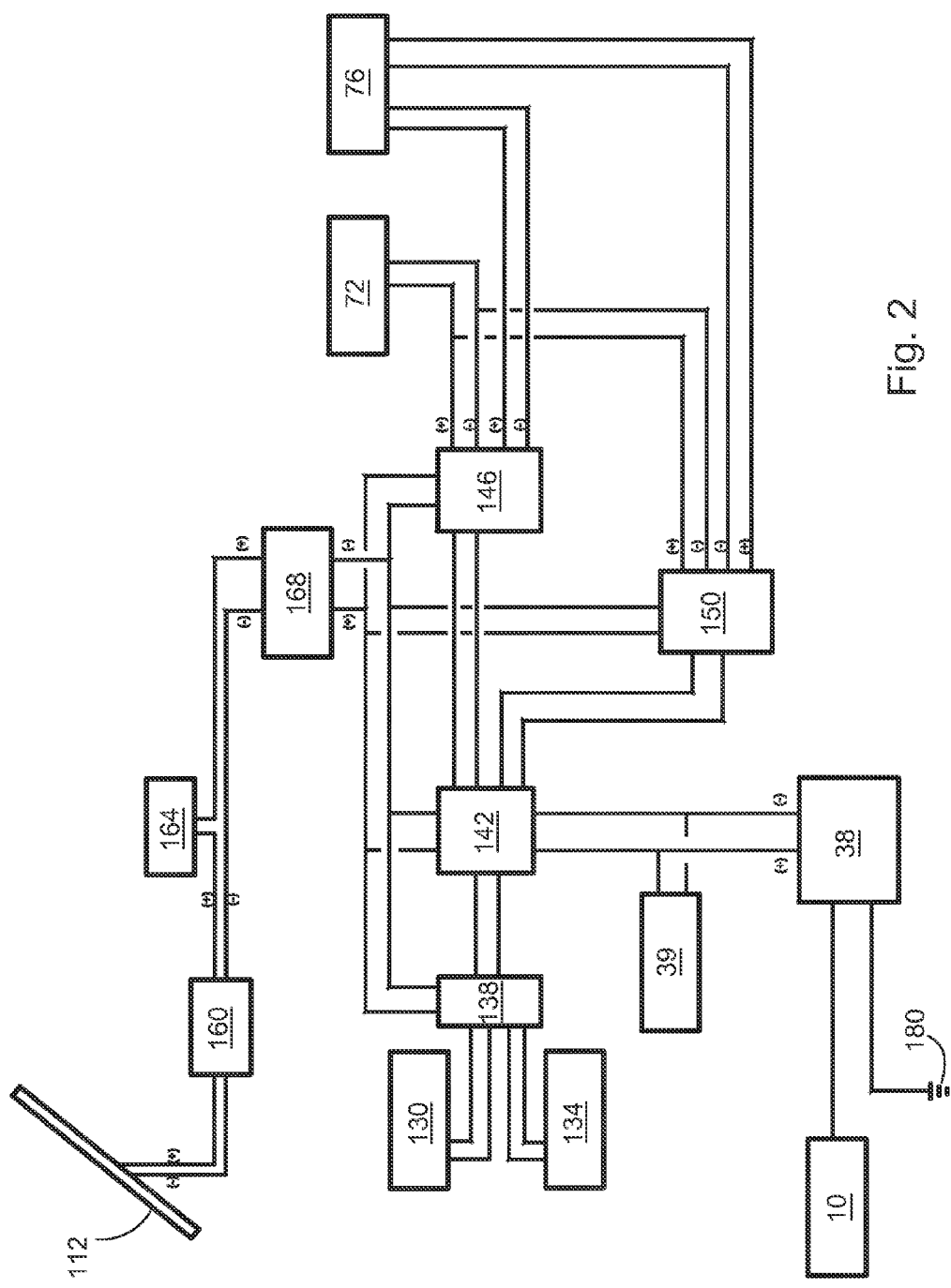
FIG. 2 is a wiring diagram for the species specific feeder.

Referring now to FIG. 2 of the drawings, the species specific feeder may have Microphones 130 that pickup sounds from the area outside of, but near Feeder 10. Audio from Microphones 130 is transmitted to sound and video card 138 where that sound is interpreted to determine if the audio captured by Microphones 130 is that of the desired species. In embodiments in which Microphones 130 are used without the assistance of video detection Sound and video card 138 would just be a sound card having the capability to identify species specific sounds. Optionally, Video detectors 134 may be used to capture video of the surroundings of Feeder 10. Video detectors 134, if used, are capable of identifying specific species and transmitting a signal upon the recognition of that specific species. Whether by audio or video, when Sound and video card 138 recognizes the presence of the relevant species near Feeder 10, Sound and video card 138 sends a signal to First timer relay 142. First timer relay 142, upon receiving a signal that the relevant species is near Feeder 10, shuts off power to Electrical pulse charger 38, thereby eliminating the possibility of a deterrent electrical discharge when the relevant species comes into contact with Feeder 10. In examples where only audio recognition is used Sound and video card 138 may be a sound card designed to recognize a species specific sound and capable of providing a signal to a relay in response to that species specific sound. Although First timer relay 142 deprives Electrical pulse charger 38 of power for a set period of time, if First timer relay 142 receives an additional signal from Sound and video card 138, First timer relay 142 will reset the timer so that Electrical pulse charger 38 does not energize Feeder 10 while the relevant species is feeding. First timer relay 142 also sends signals to Second timer relay 146 at the same time that First timer relay 142 deprives Electrical pulse charger 38 of power. Upon receiving a signal from First timer relay 142 The second timer relay 146 both engages Door solenoid 72 unlocking Door 60 and engages Door gear motor 76 moving Door 60 into an open position. Door gear motor 76 may, for example, be a 12 V direct current parallel shaft gear motor with an output RPM of 1.5. Door solenoid 72 may be a 12 V tubular coil solenoid. Similarly, when the time expires in First timer relay 142 such that Electrical pulse charger 38 re-energizes Feeder 10, a signal is sent to Third timer relay 150 which in turn both energizes Door gear motor 76 turning it in the opposite direction to close Door 60 and temporarily engages Door solenoid 72 locking Door 60 closed. Relays suitable for the above described operations include Magnecraft/Schneider Electric Item Number: TDRSRXP-12V and model number 1EJN6 available from Dayton Electric Manufacturing Co.

Electrical pulse charger 38 is wired such that whenever power is supplied to Electrical pulse charger 38 Electrical pulse charger indicator light 39 is illuminated. Electrical pulse charger 38 is arranged and configured to be wired to a Grounding rod 180 with the other pulse terminal wired to Feeder 10.

Battery 168 supplies power to Sound and video card 138, First timer relay 142, Second timer relay 146, and Third timer relay 150. Battery 168 is charged by Solar regulator 160 which receives power from Solar panel 112. Solar power indicator light 164 indicates when Battery 168 is being charged by Solar regulator 160.

Figure 3:
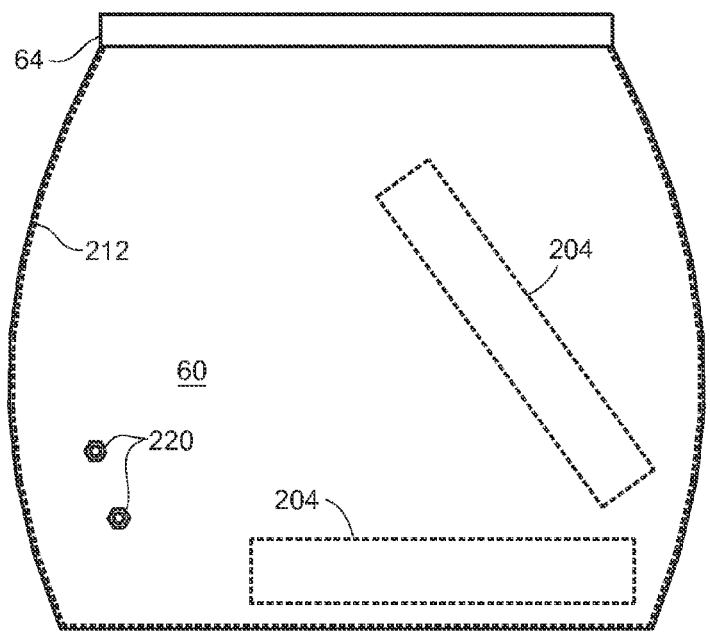
FIG. 3 is a top view of a door of the feeder.

Referring now to FIG. 3 of the drawings, Door 60 is constructed to resist damage by tampering from animals and to function within the operational parameters described above. Door 60 rotates about Door hinge 64 and has a Reinforcing door under structure 212. Door 60 may further have Reinforcing bars 204 that secure Door 60 from being compromised by bending such as may be caused by stronger animals such as bears. U-bolt nuts 220 secure U-bolt 216 (not shown) in place.

Figure 4:
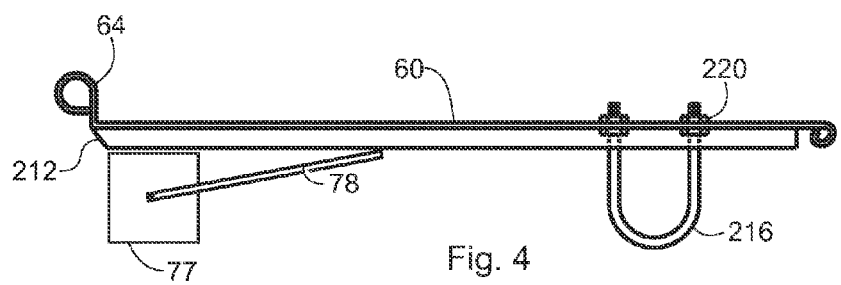
FIG. 4 is a side view of a door of the feeder.

Referring now to FIG. 4 of the drawings, Door hinge 64 is a component of Door 60. Reinforcing door under structure 212 is attached directly to Door 60. U-bolt 216 is secured in place by U-bolt nuts 220 with U-bolt 216 serving as the component of Door 60 that is locked in place by Door solenoid 72 (not shown). Lifting of Door 60 is carried out by operation of Door gear motor 76 (not shown) which is both situated inside of Door gear motor housing 77 and configured to operate Door gear motor arm 78 which lifts Door 60.

Example 2

Feeder Operation

Feeder 10 as depicted in FIG. 1 of the drawings, is placed in an area having both wild boar and other species. In the present example, it is desirable to control the population of wild boar without impacting the populations of other species. The body of Feeder 10 is positioned in an open area such that Tripod 100 is over Feeder 10. Barrel 54 is positioned within Feeder 10 substantially as depicted in FIG. 1 of the drawings. Barrel 54 may be filled and lowered into Feeder 10 such that Barrel flange 58 Meets the top of Feeder 10 using Barrel hoist pulley 92 and Pulley crank 96. Once Feeder 10 is configured substantially as depicted in FIG. 1, the electrical system is placed into an initial operational mode in which Electrical pulse charger 38 is energized and Doors 60 are both closed and locked. Feed is distributed within Feeder 10 by Auger 42 on an intermittent and timed basis, which may be daily. Wild boar may be trained to consume the feed in Feeder 10 through the use of food that does not contain a population control composition. With feed being dispersed near Doors 60 wild boar sense the presence of the feed and approach Feeder 10 making sounds that are characteristic of either a wild boars feeding or a wild boar looking for food. Microphones 130 capture the sound and Sound and video card 138 recognizes the characteristic sounds. Upon recognizing the characteristic sounds, Sound and video card 138 signals to Door solenoid 72 and Door gear motor 76 to open Door 60 by way of First timer relay 142, Second timer relay 146, and Third timer relay 150. At the same time that Door 60 begins to open, Electrical pulse charger 38 is deactivated based on a signal from Sound and video card 138 by way of First timer relay 142. The wild boar feed at Feeder 10 unencumbered by either the doors or electrical shocks generated by Electrical pulse charger 38. As the wild boar feed Sound and video card 138 continues to recognize the sound of the wild boars feeding and continues to reset the timer which ultimately acts to close the Doors 60. After the wild boar have finished feeding, the sounds of the wild boars feeding will also cease. After Sound and video card 138 does not send any additional signals indicating that the wild boar are present for a period of time, that may be set within First timer relay 142, Doors 60 close and Electrical pulse charger 38 re-energizes Feeder 10.

Species not set to be recognized by Sound and video card 138 are deterred from feeding at Feeder 10 in multiple ways. First, as Feeder 10 is continually energized by Electrical pulse charger 38, when an unrecognized species such as a deer or bear touch Feeder 10 an electrical shock is delivered. The unrecognized species quickly learn not to search for food and Feeder 10 regardless of whether they can sense feed in Feeder 10. Further, because Doors 60 are both reinforced and locked in the closed position absent the recognized species even powerful animals such as bears would be unable to access the feed. Both the shock deterrent and the sturdy locking doors are sufficient by themselves to deter animals other than wild boar from feeding at Feeder 10. The redundant protection against feeding non-selected species strengthens the device's ability to feed only a particular species.

As that term is used herein "population control composition" indicates any composition that may be delivered with or as feed that when consumed by a particular animal either has significant lethal potential or impairs the ability of that animal to reproduce. For example, sodium nitrite and sodium fluoroacetate would both be considered to be population control compositions. Upon initial placement of Feeder 10 the wild boar are allowed to feed on feed that does not contain any population control composition so that the population of wild boar become accustomed to feeding at Feeder 10. During the period in which the wild boar are becoming accustomed to Feeder 10, Feeder 10 may either be accessible as described above or may provide access to the feed without one or more of the species specific protections described above. After the wild boar population is accustomed to feeding at Feeder 10, a population control composition may be added to the feeder in quantities suitable for the desired effect on the wild boar population. For example, a poison may be added to the feed to kill all of the wild boar that feed at Feeder 10. In another example, a feed that inhibits the fertility of the wild boar may be administered such that the population of wild boar is controlled to a desirable level. The use of Feeder 10 may be on a continual basis or may be used on a short-term basis to eliminate a local population of wild boar.

Example 3

The species targeted may for example be *Sus scrofa* commonly known as wild boar. In related examples, species in the family Suidae may be targeted for feeding either individually or as a group.

Example 4

In a series of related examples, species other than wild boar may be controlled using a configuration comparable to the configuration described above. In each such instance the physical configuration of the feeder may take the form of a feeder commonly used to feed the species being targeted. Feeders having electrically conductive exteriors and doors that can be opened and closed in a secure automated way may be modified to operate in a manner comparable to Examples 2 and 3. Examples of species for which a comparable feeder may be constructed include: bear, deer, bats, raccoons, and pigeons.

The above-described embodiments have a number independently useful individual features that have particular utility when used in combination with one another including combinations of features from embodiments described separately. There are, of course, other alternate embodiments which are obvious from the foregoing descriptions of the invention, which are intended to be included within the scope of the invention, as defined by the following claims.

We claim:

1. An animal feeder comprising:
   a. an electrically conductive exterior structure;
   b. a door;
   c. a door lock;
   d. a species recognition device; and
   e. an electric shock deterrent;
   f. wherein the electrically conductive exterior structure is electrically connected to the electric shock deterrent;
   g. wherein the species recognition device is configured to recognize a species of animal by audio or video;
   h. wherein the electrically conductive exterior structure is configured to deliver an electric shock from the electric shock deterrent when the species recognition device does not recognize the species of animal; and
   i. wherein the door is configured to open in response to the recognition of the species of animal by the species recognition device.

2. The animal feeder of claim 1 wherein the door lock is arranged and configured to respond to an output from the species recognition device.

3. The animal feeder of claim 1 wherein the electric shock deterrent is arranged and configured to respond to an output from the species recognition device.

4. The animal feeder of claim 1 wherein the electric shock deterrent is arranged and configured to deactivate in response to the presence of the species of animal.

5. The animal feeder of claim 4 wherein the species of animal is a member of a class selected from wild boar, deer, bears, bats, raccoons, and pigeons.

6. The animal feeder of claim 4 wherein the species of animal wild boar.

7. The animal feeder of claim 1 wherein the electric shock deterrent is arranged and configured to reactivate after a period of time in which there is no recognition of the species of animal.

8. The animal feeder of claim 1 wherein the door lock is arranged and configured to unlock in response to the presence of the species of animal.

9. The animal feeder of claim 1 wherein the door is arranged and configured to close after a period of time in which the species of animal is not detected.

10. The animal feeder of claim 1 wherein the species recognition device is a device capable of recognizing sounds unique to the species of animal.

11. The animal feeder of claim 1 further comprising an intermittent feed dispenser.

12. The animal feeder of claim 1 further comprising a population controlling feed.

13. The animal feeder of claim 1 further comprising a microphone in communication with the species recognition device wherein the species recognition device is a sound recognition component configured to identify a species specific sound.

14. The animal feeder of claim 1 further comprising a video detector in communication with the species recognition device wherein the species recognition device is a video recognition component configured to identify a species specific image.

15. An animal feeder comprising:
   a. an electrically conductive exterior structure;
   b. a door;
   c. a detector selected from a microphone and a video detector;
   d. a species recognition device selected from a sound recognition component configured to identify a species specific sound and a video recognition component configured to identify a species specific image; and
   e. an electric shock deterrent;
   f. wherein the detector is in communication with the species recognition device;
   g. wherein the electrically conductive exterior structure is electrically connected to the electric shock deterrent;
   h. wherein the species specific sound is a sound of an animal species;
   i. wherein the species specific image is an image of the animal species;
   j. wherein the electrically conductive exterior structure is configured to deliver an electric shock from the electric shock deterrent when the species recognition device does not recognize the animal species; and
   k. wherein the door is configured to open in response to the recognition of the animal species by the species recognition device.

* * * * *